United States Patent [19]

Glatt et al.

[11] Patent Number: 4,476,804

[45] Date of Patent: Oct. 16, 1984

[54] PROCESS OF COATING OF PARTICLES, PARTICULARLY PARTICLES OF MEDICINAL DRUGS, AND APPARATUS FOR IMPLEMENTATION OF THE PROCESS

[75] Inventors: Werner Glatt, Binzen; Erwin Grab, Rummingen, both of Fed. Rep. of Germany

[73] Assignee: Glatt Maschinen-und Apparatebau AG, Pratteln, Switzerland

[21] Appl. No.: 462,089

[22] Filed: Jan. 28, 1983

[30] Foreign Application Priority Data

Jan. 29, 1982 [CH] Switzerland ............................ 555/82

[51] Int. Cl.³ ............................................. A23G 3/26
[52] U.S. Cl. ......................................... 118/19; 118/20
[58] Field of Search .................... 34/130, 138; 118/19, 118/20, 303

[56] References Cited

U.S. PATENT DOCUMENTS

| | | |
|---|---|---|
| 3,357,398 | 12/1967 | Gross . |
| 3,357,978 | 12/1967 | Gross ................................. 118/418 |
| 3,573,966 | 4/1971 | Hostetler ............................ 117/100 |
| 3,874,092 | 4/1975 | Huhlin .................................. 118/19 |
| 3,934,545 | 1/1976 | Schady ................................ 118/303 |

FOREIGN PATENT DOCUMENTS

| | | |
|---|---|---|
| 232744 | 3/1911 | Fed. Rep. of Germany ........ 34/138 |
| 2212985 | 9/1973 | Fed. Rep. of Germany ........ 118/19 |
| 2805801 | 8/1979 | Fed. Rep. of Germany ........ 118/20 |
| 0007747 | 4/1979 | Japan .................................... 118/20 |
| WO82/03972 | 11/1982 | PCT Int'l Appl. . |
| 489511 | 2/1976 | U.S.S.R. .............................. 118/19 |

Primary Examiner—Sam Silverberg
Attorney, Agent, or Firm—Fleit, Jacobson, Cohn & Price

[57] ABSTRACT

A process and apparatus for coating particles, particularly particles of medicinal drugs. The apparatus has a rotating drum provided with a perforated cylindrical center section. Particles to be coated are introduced into the interior of the drum and form a layer in a lower quadrant of the cylindrical section during rotation of the drum. A spraying device is located in the interior of the drum for coating the particles with an appropriate mixture or solution. A device is positioned adjacent the portion of the drum containing the particles for introducing gas through the perforations into the layer of particles so as to dry the particles. A device also is provided for removing gas from the drum through the perforations. The device for introducing gas can be separated from the device for removing gas by a central partition, with both devices being carried by a common support. Also, it is possible to introduce gas into a portion of the interior of the drum that is spaced from the layer of particles.

17 Claims, 4 Drawing Figures

PROCESS OF COATING OF PARTICLES, PARTICULARLY PARTICLES OF MEDICINAL DRUGS, AND APPARATUS FOR IMPLEMENTATION OF THE PROCESS

BACKGROUND OF THE INVENTION

1. Field of the Invention

The present invention relates to an apparatus and a process of coating particles, particularly particles of medicinal drugs. Particles to be coated are placed inside of a rotating drum and a coating solution or mixture is sprayed on the particles. The particles are dried and removed from the drum.

2. Description of the Prior Art

U.S. Pat. No. 3,573,966 describes a device in which tablets to be coated are introduced into a drum rotatable around a horizontal axis. The drum has a cylindrical, perforated casing or sheathing. The drum is rotated so that the tablets form a layer which is found essentially in one of the lower quadrants of the drum, and coating material is sprayed on the tablets. Subsequently, air is sucked out of the drum through the layer of tablets and through the casing by a suction socket which is adjacent to the external surface of the casing. It is not mentioned in the text of U.S. Pat. No. 3,573,966 how, or if, the air which has been sucked off is subsequently delivered to the drum. The air which has been sucked out of the drum must obviously flow afterwards above the layer of the tablets in the drum, in the course of which an air current is produced through the perforations of the casing.

The air which has been sucked out of the drum through the drum's casing strikes the tablets with a force which is added to the force of gravity and the centrifugal force. This additional force also presses the tablets against the walls of the perforated casing. Such pressure results in relatively heavy abrasion of the tablets and of the coating material applied to the tablets, which is a drawback.

When the coating material, which is to be sprayed on the tablets by a sprayer inside of the drum, has been dissolved in water or in some other solvent and is then sprayed on the tablets, the process takes place with intensive contact between the spray and the air, which is usually heated before it is delivered to the drum. As a result, a portion of the solvent is already vaporized, before the solvent and the coating material hit the tablets. Thus, a portion of the coating may be already too dry to stick firmly to the tablets by the time it reaches them. This is also detrimental.

Furthermore, it is well known in the light of U.S. Pat. No. 3,357,398, that tablets can be coated in a drum rotating around an inclined axle. The drum of this reference has not only a cylindrical portion of the wall perforated, but also conical portions of the wall on both ends of the cylindrical portion. The drum is enclosed in a housing which is surrounded by an intermediate space. This intermediate space is tightly closed and separated from the environment and is divided by packing into two uneven large parts. One of the parts, the smaller one, extends approximately through that section of the drum's circumference in which the layer of tablets is located, when the drum is in operation.

The air is brought into the drum through the perforated wall of the drum and through the layer of tablets at the smaller part of the intermediate space, and it is taken out at the other, larger section of the intermediate space, again through the wall of the drum. The disadvantage of this direction of the air stream is that light pieces, including dust formed through abrasion, are blasted upwards out of the drum. Furthermore, it is difficult to control the input of air in such a way that the supply of air has a good drying effect, without hampering the spraying of the coating material.

Another device for coating particles, particularly drugs in the form of particles, is described in International Patent Application No. PT/CH82/00071, which has been published on Nov. 25, 1982, as WO 82/03972. This application describes an apparatus similar to that provided by the present invention.

SUMMARY OF THE INVENTION

The present invention has as one of its objects the provision of a method of coating particles in which a stream of gas is supplied through a layer of particles in a drum in such a way that the disadvantages of the known processes are eliminated to the maximum possible extent.

Another object is to provide an improved apparatus or device for coating particles in a rotating drum.

It should be noted that the terms "particles" and "particles of medicinal drugs" used in the application are generic terms that are understood to cover solid medicinal drugs and drugs having a solid outer cover, that is, solid presentation forms of medicinal drugs. Such drugs can be tablets, pills, or capsules. Further, the process and the apparatus according to the invention can be used for coating of candies and other products, particularly including certain particles which are to be coated in large quantities.

In one embodiment of the apparatus according to the present invention, a drum is mounted for rotation within a housing. A central cylindrical portion of the drum is perforated. An opening is provided in the cylindrical portion for removal of coated particles from the drum. Preferably, particles to be coated are introduced into the drum through one end thereof. During rotation, the particles form a layer in a lower quadrant of the drum. A spraying device is disposed in the interior of the drum for applying a coating solution or mixture to the particles. A gas carrying socket is disposed adjacent the quadrant of the drum containing the particles and has a first compartment for introducing an appropriate gas through the perforations of the drum into the bed of particles. The socket has a second compartment for removing the gas from the drum through the perforations. Also, the gas can be introduced into the interior of the drum above the layer of particles. The air introduced into the drum through the perforations minimizes frictional contact between the particles and the rotating drum.

The process of coating particles provided by the present invention includes the introduction of particles to be coated into the interior of a rotatable drum having a perforated cylindrical section; spraying the particles with coating materials during rotation of the drum; introducing gas through a portion of the perforations into the particles so as to dry the coated material; and removing the gas from the drum through another portion of the perforations. In a variation of the process, gas is also introduced into the interior of the drum in a region spaced from particles being coated.

The invention, and its objects and advantages, will become more apparent in the detailed description of the preferred embodiments subsequently presented.

BRIEF DESCRIPTION OF THE DRAWINGS

In the detailed description of the preferred embodiments of the invention hereinafter presented, reference is made to the accompanying drawings, in which.

DESCRIPTION OF THE PREFERRED EMBODIMENTS

The embodiment of the apparatus for coating tablets, which is shown in FIGS. 1 to 4, has a stand 3 placed on the floor 1 of a room. The stand 3 preferably is built at least partly from structural bars which have been welded together. A drum 7, which is rotatable around a horizontal axis 5, is supported for rotation with respect to the stand 3.

Figure 1:
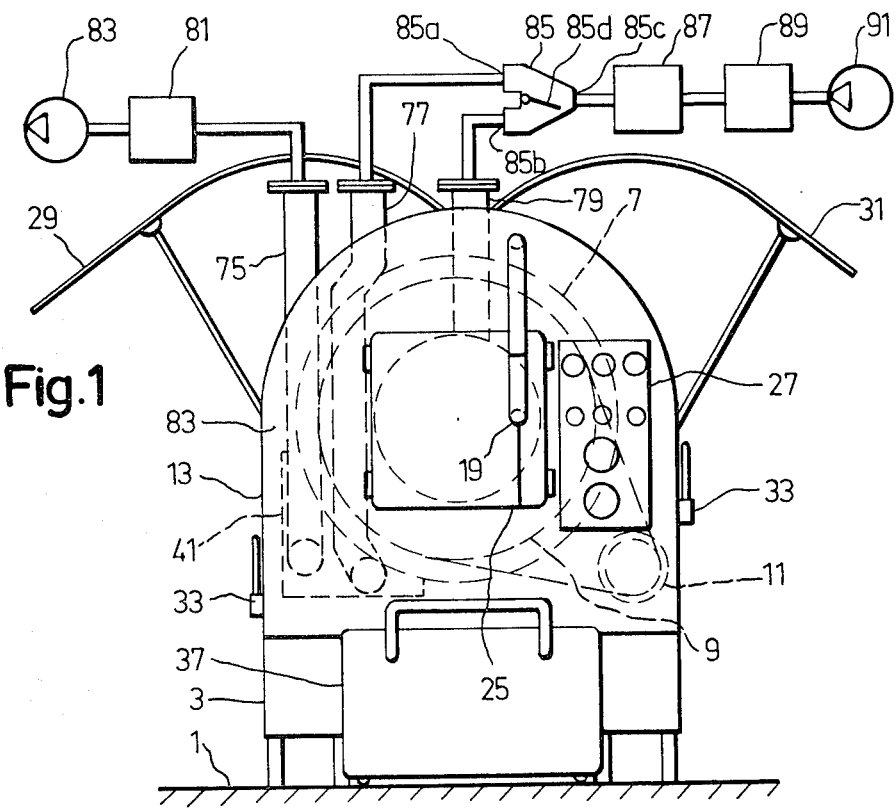
FIG. 1 is a front view of one embodiment of an apparatus for coating tablets, with the hinged side lids of a housing of the apparatus opened.
Figure 2:
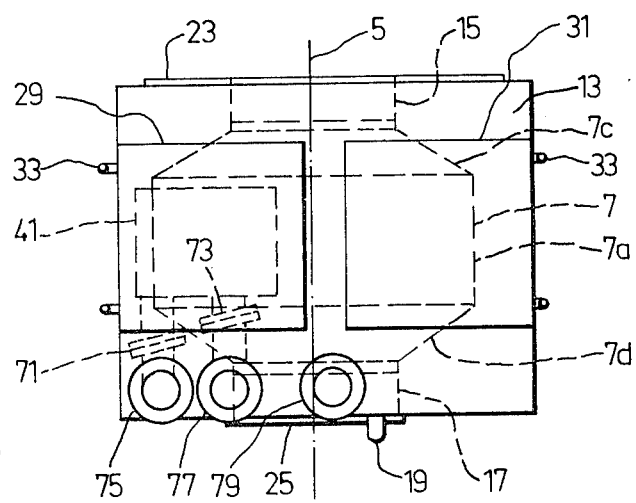
FIG. 2 is a plan view of the apparatus of FIG. 1, with the hinged side lids closed.
Figure 3:
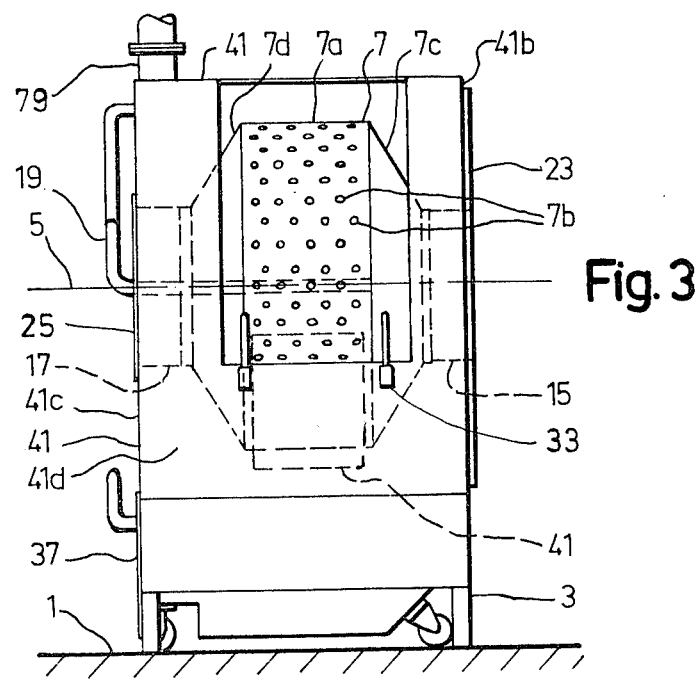
FIG. 3 is a side view of the apparatus of FIG. 1, with the hinged lid facing the viewer removed.

The wall of the drum 7, which is essentially symmetrical to the axis of rotation 5, has a central part shaped as a cylindrical casing or sheathing 7a. As can be seen in FIG. 3, the casing 7a is provided with a plurality of perforations, apertures, openings, or holes 7b. For ease of illustration, the apertures 7b are shown with excess sizes and distances. The apertures 7b are distributed evenly around the periphery of the casing 7a. The perforations do not extend over the entire axial dimension of the drum 7, as measured in a direction parallel to the axis of rotation 5. Thus, drum 7 has areas without perforations on both sides of the perforated casing 7a. The sidewall portions 7c and 7d are attached on each side respectively of the casing 7a. They are not perforated and are conical or reduced to a smaller scale by tapering. On the narrower ends of the conical portions of the walls 7c and 7d, there is a small cylindrical rim on each side, which borders the opening. The casing 7a has an output opening for taking out the tablets. This opening extends over the entire width of the casing 7a, as measured parallel to the axis of rotation 5. The opening is spaced from the tapered portions of the walls 7c and 7d, and can be locked with a locking element or means having a cover plate and means for locking the cover plate in a position blocking the opening in the casing 7a. The cover plate is attached to the drum by hinges for movement around a swivel axis, which is parallel to the axis of rotation 5. The cover plate of the locking element also is perforated and has an external surface, in the locked or blocking position, that is substantially continuous with the surface of the casing 7a, if the hinges located at the rims of the casing 7a are disregarded. The cover plate of the locking element can be held in the locked position or opened, as desired, by means of a pneumatic cylinder mounted on the drum. "Shovels" for collection of the tablets can be attached to the drum 7 on the inside. They are not shown in the drawings. At the front of the drum 7, which is to the right in FIG. 3, the drum is provided with ball bearings, which are not illustrated, and is connected in a fixed rotary position with a gear wheel 9, which is illustrated in FIG. 1. A driving mechanism 11 has a motor and a gear wheel. The gear wheel of the motor is connected with the gear or toothed wheel 9 by a belt or chain.

Figure 4:
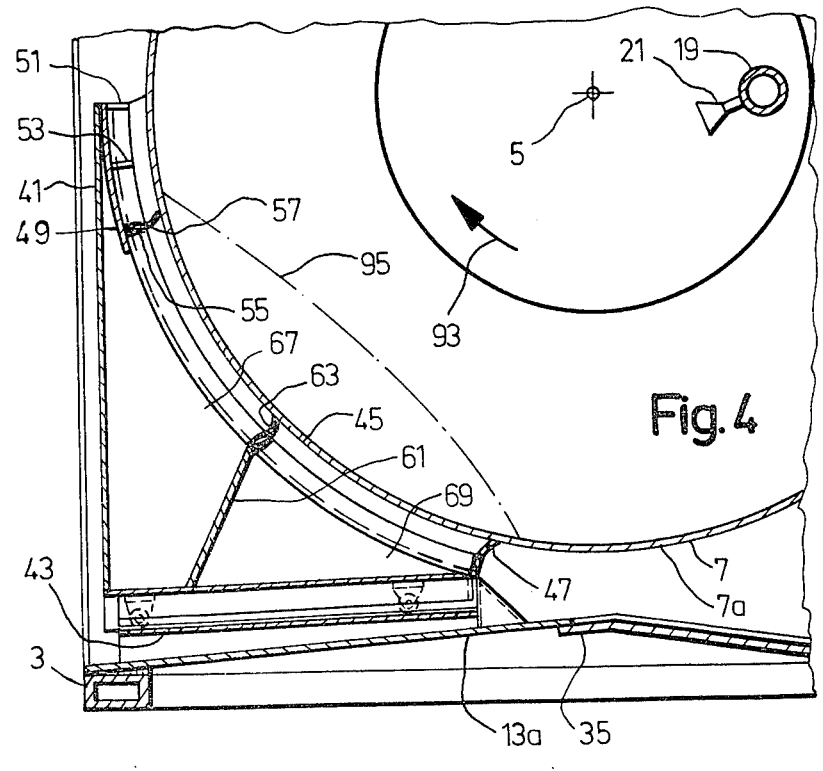
FIG. 4 is a cross section, on an enlarged scale, of a portion of the drum and the gas carrying socket.

The apparatus includes a housing 13 supported by the stand 3. The housing 13 has a base 13a, as illustrated in FIG. 4, located under the drum 7 and the driving mechanism 11, two front walls, and a U-shaped section. This section forms two sidewalls and an arched deck wall, which gradually changes to form part of these two walls. The housing 13 surrounds the drum 7 and separates it from the environment, at least to some extent. Preferably, the housing has a dustproof and gas-tight cover. The base 13a tapers downwardly slightly from both sides of its middle line, which runs parallel to the axis of rotation 5. An essentially cylindrical support 15 or 17 is fastened on respective ones of the two front walls of the housing or directly on the stand 3. The two supports are coaxial with the axis of rotation 5. The support 15 is slightly thinner than the limited aperture shown in FIG. 3 and is located on the right side edge of the drum from the inner surface. It is projected slightly into this aperture with certain amount of free play. The support 17 has approximately the same diameter as the edge of the drum which is turned towards it and almost pushes against it.

A spraying device or means 19 includes a spray holding pipe, which extends through the support 17 into the drum 7. Spray nozzles 21 are attached to the pipe for spraying the coating material. The portion of the spray holding pipe, which projects from the housing 13, is curved upwards and connected with an equally curved pipe, which forms part of a telescopic drawer. This drawer can be pulled out upwards over the drum 7 in a direction which is parallel to the axis of rotation. It is equipped with a flange connection to fasten a lead pipe that brings in the spray material. In addition, it can be pulled out in such a way that the pipe of the spray holding device 19 can be pulled out entirely from the drum 7 and the support 17 for cleaning and checking.

The ends of both supports 15 and 17 of the drum 7 can be hermetically sealed at least to some extent by locking elements which are arranged in a movable or loose position on both front sides of the housing, for example, by a one-leaf door 23 or a two-leaf door 25. On the front wall of the housing 13, which can be seen in FIG. 1, there is also available an instrument panel 27 with indicators and servicing elements. On the roof of the housing 13, there are two hinged lids 29 and 31, which are fastened by swivel joints. The axes of these swivel joints run parallel to the axis of rotation 5. These lids can be locked in an open position, as shown in FIG. 1, and supported with props. The lids also are movable into a closed position in which they are held by bolting elements 33, and the opening located in the housing 13 is tightly locked. Furthermore, the walls of the housing 13 also are equipped with additional openings (not illustrated) used mainly for purposes of maintenance and cleaning. These additional openings can be blocked or locked by locking disks, also not illustrated.

An opening is also available in the base 13a of the housing 13. This opening can be blocked or locked with a base lid 35, which is illustrated in FIG. 4 in its locked position. The base lid is fastened with bolts (not shown), and it can be held by choice in its locked position by a pneumatic cylinder (not shown), or it can be bolted underneath in an open position. The frame 3 is built in such a way that there is a free space left between the floor 1 and the base of the housing 13a. A carriage 37, which is shown only in FIGS. 1 and 3, can be inserted in that space. The carriage has a handle and a container in the form of a pod or trough, which is open at the top.

An air or gas carrying socket 41, which can be seen very clearly in FIG. 4, is provided with regard to the axis of rotation 5 of the drum, in the lower quadrant which is located in FIG. 1 on the left side of the vertical plane which runs through the axis of rotation of the drum. The socket 41 can be moved out of position in a direction perpendicular to the axis of rotation 5. In order to accomplish such movement, a guiding device is provided on the top of the base 13a, which is fastened on a horizontal frame of the stand 3.

This guiding device is built in the form of a slide used for a drawer and has rails attached to the housing 13 or directly to the stand 3. The rails run perpendicular to the axis of rotation 5 of the drum and are set up either horizontally or at a slight angle from the horizontal. A sliding carriage 43 is guided by these rails and is equipped with rollers or sliding surfaces. When the lid 29 is open, the conveyance socket 41 can be moved by hand through the opening located in the housing 13 between a first or operating position and a second or cleaning position. In the cleaning position, the socket 41 is separated by a space from the drum 7. When it is in the operating or first position, the socket 41 is completely inside of the housing 13 and is closely spaced from the casing or sheathing 7a of the drum 7. The conveyance socket can be stopped in either of its end positions by means of stopping devices. In addition, the conveyance socket can be lifted from the sliding carriage when it is in the extended or cleaning position, and can be removed completely from the rest of the apparatus. The width of the conveyance socket 41, measured parallel to the axis of rotation 5, is at least equal to the corresponding dimension of the perforated section of the casing 7a. However, at the same time, the conveyance socket is built and measured out in such a way that the hinges of the locking device of the feed aperture of the drum, which serves to lock the aperture, can pass on both sides of the conveyance socket while the drum 7 rotates with the conveyance socket in its operating position.

The conveyance socket 41 is built essentially as a hollow body having an open side with a curved form coaxial with the axis of rotation of the drum on the side which faces the casing 7a of the drum 7, when the socket is in the operating position. The conveyance socket is open in the area of its side which is turned towards the drum, or in other words has an aperture on that side which communicates with the hollow space. This aperture is bordered on opposite vertical sides with a packing 45, which forms an arc of a circle. This arc is coaxial with the axis of rotation of the drum. In the operational position, each of the two packings 45 is adjacent to one of the sections of the rim of the casing 7a which has no perforations. Thus, the packings 45 cooperate with the casing 7a to prevent or substantially limit gas flow between the ends of casing 7a and the socket 41. A curved sheet 49, which is coaxial with the axis of rotation of the drum, is inserted in the upper section of the conveyance socket 41. This sheet is hermetically sealed to the lining of the conveyance socket at its upper rim, as well as at both of its side rims. Three packing holders (51, 53, and 55) are fastened to the side of the sheet 49 which is turned towards the drum 7. These holders are spaced along a circular arc which extends around the axis of rotation 5 of the drum. In addition, they are shaped like grooves in the form of a U, with the open side of each groove facing the drum. A packing 57 can be inserted by choice in one of these packing holders, for example, as shown in FIG. 4, in the lowest packing holder 55. Thus packing 57, which runs parallel to the axis of rotation 5, forms the upper boundary of the aperture of the conveyance socket and is placed closely to the drum, just like the other packings 45 and 47. In addition, the ends of the four packings (two packings 45, one packing 47, and one packing 57) are closely adjoining and, as a result, the packings 45 and 47 can be connected, so that the hollow space of the conveyance socket in its operating position is at least to some extent hermetically connected with the drum. A partition wall 61 is provided in the hollow space of the conveyance socket 41 and runs parallel to the axis of rotation of the drum. The partition wall is hermetically connected with the basè section and with the sidewalls of the conveyance socket and holds packing 63. Just like the packings 45, 47, and 55, this packing can be deformed elastically and has thick margins in the form of lips. When the conveyance socket is in its operating position, the packing 63, just like the packings 47 and 57, is placed parallel to the axis of rotation 5 of the drum on the external side of the casing 7a of the drum. In addition, packings 47, 57 and 63 are contiguous at their outer ends with the packings 45, or they are connected with packings 45. The partition wall 61 and the packing 63 divide the hollow space of the conveyance socket 41 into two chambers, which are hermetically separated from each other in the operating position. These are the second or draining chamber 67 and the first or feed chamber 69. The feed chamber 69 introduces gas into the lower part of the drum containing the layer of particles through a first group of perforations, while the draining chamber 67 removes gas from the drum through a second group of perforations.

When the conveyance socket 41 is in its operating position, each of these chambers 67 and 69 is connected tightly by a coupling 71 or 73 with a conduit 75 or 77, which is located partly in the housing 13. Each coupling 71, 73 has two coupling elements in the form of ring flanges, one of which is attached rigidly to the conveyance socket 41 and the other rigidly to the stand 3.

When the conveyance socket 41 is in its operating position, the coupling elements in the form of ring flanges are next to each other in pairs in a tangential plane, which runs vertically and later forms a certain angle in the sliding direction of the conveyance socket. The angle is preferably not greater than 45 degrees. The tangential plane is consequently set up in such a way that the coupling elements can be separated by shifting the conveyance socket 41 away from the drum. For that purpose, at least one of the two coupling elements in each coupling is provided with a gasket, which can be deformed elastically.

When the conveyance socket 41 is shifted away from its operating position towards the outside of the drum, the coupling elements are separated from the couplings 71 and 73, and, as a result, the conveyance socket becomes disconnected.

Furthermore, it should be noted that detachable stretching means can be provided to overlap the coupling elements, which belong together in the operating position, and to bring them together. These stretching means would be made in such a way that they could be brought into a release position by few manipulations by hand, perhaps by turning a lever from a tightening position, in which the coupling elements would be brought together. In the release position, the coupling elements could be separated by shifting of the conveyance socket.

There is also available conduit means, including a conduit 79, which is located partly in the housing 13. The conduit 79 runs into the support 17 and is connected through it with the inner space of the drum 7. The three conduits 75, 77, and 79 can be located, for example, on the same side of the housing 13 where the support 17 is located, then come out of it on the upper side of the housing 13, and be provided there with connections of the flange type. The conduit 75 is connected, through a pipe, with a filter 81 and with the suction intake of a suction blower 83. Conduits 77 and 79 are connected with one of the pipe joints 85a and 85b, respectively, of a gas supply distributor 85. The third pipe joint 85c of the distributor 85 is connected with the outlet of a blower 91 through a heating unit 87 and a filter 89. The distributor 85 includes means for adjusting the ratio of air flow between conduits 77 and 79, such as a blocking device 85d, which can be moved, for example, by a hand-operated sliding lid. By setting the blocking device 85d in the appropriate position, one can adjust the ratio or distribute between the conduits 77 and 79 air delivered from the blower 91 and heated by the heating element 87. This also makes it possible to supply air, at will, to only one of the conduits, particularly conduit 77.

Now, an explanation will be provided of the operation of the apparatus. First of all, a load of tablets or other material to be coated is inserted into the drum through one of the circular supports 15 or 17. Next, the aperture of the given circular support is shut and the drum 7 is turned, by the driving mechanism 11, in the direction of the arrow 93 of FIG. 4. The load of tablets or particles is moved by the rotating movement of the drum 7 to the quadrant of the drum 7 where the conveyance socket 41 is located in its operating position. The load of tablets forms a layer 95, which is represented in FIG. 4 in the form of dots and dashes. This layer covers approximately the section of the circumference of the inner surface of the casing 7a, which is delimited by the two packings 47 and 57. It stretches mostly on all sides a little beyond this section of the circumference. When the drum 7 turns, liquid coating material, which has been dissolved to some extent or formed as a suspension, is introduced through the spraying device 19 and sprayed by one or more spray nozzles 21 against the layer of tablets 95. After that, air or a protective gas is directed by the blower 91 through the filter 89, the heating element 87, and the distributor 85 so that the air or gas is filtered and heated. A portion of this desiccating gas flows then through the conduit 79 into the part of the inner space of the drum 7 which is above and close to the layer of tablets 95. Another portion of this desiccating gas is brought through the conduit 77 and the coupling 73 into the chamber 69 of the gas carrying socket 41. From there, the desiccating gas flows through the perforations of the casing 7a into the layer of tablets and through the layer into the drum. At the same time, the gas is sucked through the perforations of the casing 7a out of the inner space of the drum 7 and into the chamber 67.

The aperture of the chamber 69, which is turned towards the external surface of the casing 7a of the drum, constitutes an intake aperture through which desiccating gas is brought into a portion of the casing 7a of the drum which is covered with the layer of tablets 95. The aperture of the chamber 67 forms analogically a drain aperture, through which gas is removed from the drum through a section of the casing 7a partly covered with the layer of tablets 95. The intake aperture and the drain aperture are located along the circumference of the drum in such a way that, if one looks at the intake aperture in the direction of rotation, the intake aperture is upstream or in front of the drain aperture and also is located lower than the draining aperture. Furthermore, the intake aperture and the drain aperture extend each over at least 25 percent over that portion of the perimeter of the casing 7a of the drum, that is (at a given moment) covered with the layer of tablets 95. Thus, the intake aperture as well as the drain aperture cover each at least 25 percent of that area of the casing 7a that comprises perforations and is covered by the layer of tablets 95. The intake and the drain aperture namely cover together nearly totally or approximately that portion of the perforated casing 7a whose area 15 is covered at a given moment by the layer of tablets 95.

Warm desiccating gas, which is brought in through the layer of tablets 95, dries out the coating material which has been sprayed on the tablets. The desiccating gas, which has been introduced through the chamber 69, exerts against the tablets a force acting from the inner surface of the casing 7a of the drum in a direction towards the center of the drum 7. This force compensates partly the force of gravity and the centrifugal force which act on the layer of tablets. As a result, abrasion of the bodies of the tablets and abrasion of the coating material sprayed on them is reduced. By using the gas intake distributor 85, one can adjust the amount of the desiccating gas introduced through the chamber 69 and introduced through the circular support 17 in such a way that the desiccating gas introduced through the chamber 69 would not noticeably hamper the movement of the coating material sprayed against the layer of the tablets. In particular, one can bring about a situation in which a portion of the gas which has been introduced through the chamber 69 flows through the layer of tablets to the entrance of the chamber 67, without causing a signficant flow of gas in the empty or interior part of the inner space of the drum, that is, in the portion of the drum where there are no tablets.

Furthermore, both blowers 83 and 91 can be built in such dimensions and eventually regulated or calibrated in such a way that the air pressure in the drum during the coating process would be about the same as in the environment.

The possibility of adjusting the packing 57 makes it possible to adjust the capacity of the drum or the corner area to correspond with the amount and the mobility of the tablets which have been introduced into the drum 7, in addition to adjusting the air which has been sucked from the drum 7 into the conveyance socket 41. In this way, one can bring about a situation in which the suction area, that is, the outlet aperture of the chamber 67, reaches either approximately all the way to the upper edge of the layer of tablets, or to a level just below the upper edge, or to a level just above the upper edge.

After a load of tablets is coated with the coating material and the coating is dried, rotation of the drum 7 is stopped in such a position that the tablets can be emptied into the carriage 37 through the aperture which is located in the casing of the drum and through the aperture which is located in the base 13a (the aperture closed with the base lid 35).

The apparatus can be modified in various respects. For example, the packing 57 can be made continuously adjustable, and the packing 47 can be also arranged as removable or adjustable. Furthermore, the partition wall 61 and the packing 63 can be built also as removable or adjustable. In addition, the intake aperture and the discharge aperture can both be lined with continuous and compact packing.

Both couplings of the conveyance socket can be set up on the sides which are turned away from each other instead of on the same side.

The intake aperture and the discharge aperture of the gas carrying socket can also run, for example, next to each other along a section of the circumference of the drum. Furthermore, the intake aperture could surround the discharge aperture in the form of a ring. In addition, there could be several intake apertures and/or several discharge apertures.

Beyond that, the gas supply and distributor can be built with two valves forming a gas switch, each of them having an adjustable regulator. Furthermore, there is also the possibility of providing two separate gas-carrying sockets. One of them could be used for the intake of gas, the other for its discharge.

Also, the casing of the drum could be perforated in a number of sectors distributed over the circumference, instead of covering the entire circumference. In that case, it would be possible to provide as intake chambers and outlet chambers a number of channels attached firmly on the outer side of the drum casing, which would then rotate with the drum. Those channels which are located directly in the area of the layer of tablets could be connected with blowers used for blowing air in or sucking it out. This could be done through gas couplings set up on one of the face sides of the drum.

Finally, it would be also possible to turn the drum around an inclined axis of rotation. In that case, the wall of the drum could be somewhat in the form of a kettle or onion, and would naturally have to have a base section closing the lower portion of the drum.

In summary, one embodiment of the apparatus according to the present invention has a housing 41, in which a drum 7 with a partly perforated casing or sheathing 7a is rotatable around a horizontal axis of rotation 5. At the lower quadrant of the drum 7, in which the layer of tablets 95 forms when the drum 7 rotates, there is a gas carrying socket 41 which has a chamber 69, through which a desiccating gas, especially hot air, can be introduced into the drum 7. The gas passes through the casing 7a and then through the layer of tablets 95. The gas can be sucked out of the drum 7 through the layer of tablets 95 by passing through another chamber 67 of the conveyance socket 41. In addition, desiccating gas also can be introduced into the inner space of the drum 7 above the layer of tablets 95. In this way, streams of air can be created in the layer of tablets 95, through which coating material sprayed on the tablets can be dried quickly, and consequently, at the same time, abrasion of tablets can be kept low.

Previously, specific embodiments of the present invention have been described. It should be appreciated, however, that these embodiments have been described for the purposes of illustration only, without any intention of limiting the scope of the present invention. Rather, it is the intention that the present invention be limited only by the appended claims.

What is claimed is:

1. An apparatus for coating particles comprising:
   a drum mounted for rotation about an axis, said drum having a circumferentially extending wall section containing perforations;
   a housing encompassing said drum;
   means for rotating said drum so that particles within the portion of the drum containing perforations form a layer in the lower portion of the drum;
   means disposed within the drum for spraying coating material on the particles;
   first chamber means having a portion positioned adjacent the periphery of the drum and including an opening for introducing gas through perforations which are substantially covered by said layer of particles and into the interior of the drum to thereby dry sprayed particles; and
   second chamber means spaced from said first chamber means and having a portion adjacent the periphery of the drum, said second chamber means including an opening for removing gas from the drum through perforations which are substantially covered by said layer of particles.

2. Apparatus according to claim 1, further comprising a gas carrying socket carrying said first and said second chamber means.

3. Apparatus according to claim 1, further comprising a partition wall separating said first chamber means from said second chamber means.

4. Apparatus according to claim 1, wherein the portion of said first chamber means adjacent said drum is disposed below the portion of said second chamber means adjacent said drum.

5. Apparatus according to claim 1, further comprising conduit means for introducing gas into said drum at a location spaced from the layer of particles.

6. Apparatus according to claim 5, further comprising a gas supply distributor for distributing gas to said first chamber means and to said conduit means, and means for adjusting said gas supply distributor to thereby control the ratio between the amount of gas furnished said first chamber means and the amount of gas furnished said conduit means.

7. Apparatus according to claim 1, wherein said wall section containing perforations comprises a centrally disposed cylindrical casing rotatable about a horizontal axis, said drum comprising non-perforated conical sections merging with axial ends of said casing and tapering inwardly towards axial ends of said drum.

8. An apparatus according to claim 1, wherein the area of the perforated wall through which gas is introduced into the drum as well as the area of the perforated wall through which gas is removed from the drum is each at least 25% of the area of the perforated wall of the drum that is covered by particles.

9. An apparatus according to claim 1, wherein the openings of said first and second chamber means facing said perforated wall section are separated from each other by a separation member that extends in a direction parallel to the axis of rotation of said drum.

10. An apparatus according to claim 1, wherein the size of at least one of the openings in said chamber means is defined by limiting means adjustable along the periphery of the drum.

11. An apparatus according to claim 1, wherein the openings of said first and second chamber means facing said perforated wall section are defined by elastically deformable packings that engage said perforated wall section.

12. An apparatus according to claim 1, wherein said first and second chamber means are arranged in a common hollow conveyance socket and separated by a partition wall.

13. An apparatus according to claim 12, including a framework rotatably supporting said drum and having supporting means for removably supporting said conveyance socket relative to said drum.

14. An apparatus according to claim 13 wherein said supporting means slidably guide said conveyance socket perpendicularly to said axis of rotation.

15. An apparatus according to claim 13 wherein said conveyance socket is completely removable from the apparatus.

16. An apparatus according to claim 13 wherein said housing encompasses said drum and said conveyance socket and has an opening through which the conveying socket can be passed when it is removed from the drum, said opening of the housing including a closing member to close said opening when said conveyance socket is adjacent the drum.

17. An apparatus according to claim 13, including a first conduit for supplying gas to said first chamber means and a second conduit for withdrawing gas from said second chamber means, said conduits being rigidly mounted to said framework, wherein couplings are provided each coupling having a member rigidly attached to the conveyance socket and a member rigidly attached to said first and second conduits, respectively, said couplings connecting said chamber means tightly with said conduits when the chamber means are adjacent the drum and disconnecting said chamber means from said conduits when said chamber means are removed from the drum.

* * * * *